Feb. 15, 1949.                G. F. W. POWELL                2,461,919
                    DYNAMIC BRAKING ARRANGEMENTS FOR
                         DIRECT CURRENT MOTORS
                         Filed Sept. 12, 1945
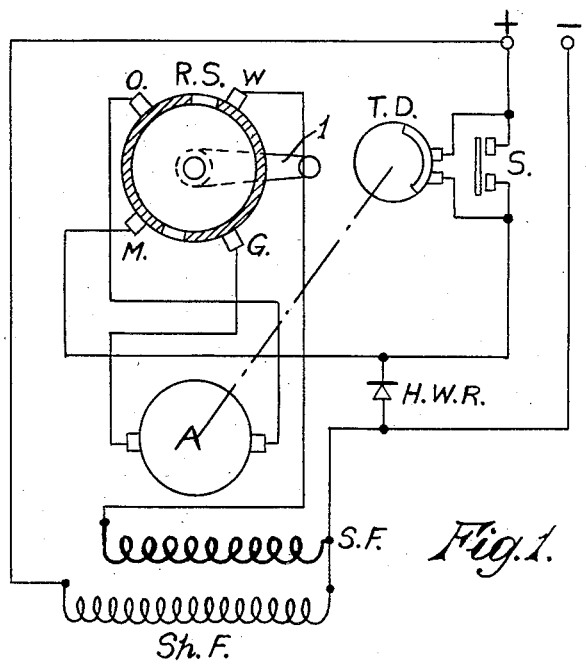
Fig.1.
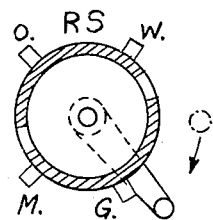
Fig.2.
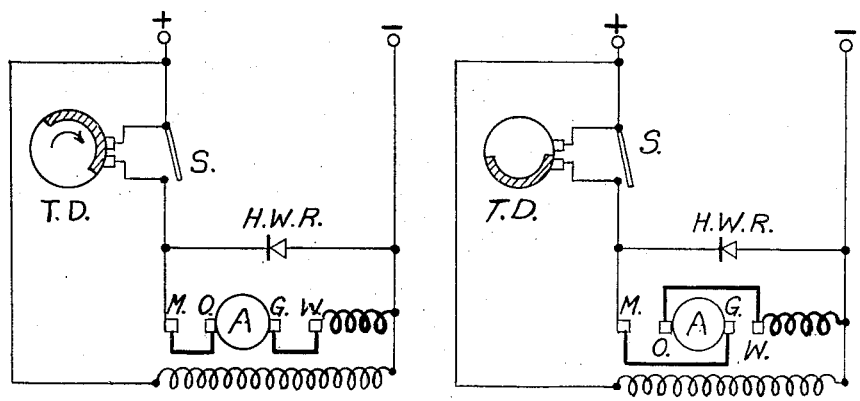
Fig.3.                    Fig.4.
INVENTOR
GORDON FRANCIS WELLINGTON POWELL
By Cushman, Darby & Cushman
                        ATTORNEYS Patented Feb. 15, 1949

2,461,919

UNITED STATES PATENT OFFICE 2,461,919

DYNAMIC BRAKING ARRANGEMENT FOR DIRECT CURRENT MOTORS

Gordon Francis Wellington Powell, London, England, assignor to Molins Machine Company Limited, London, England Application September 12, 1945, Serial No. 615,899
In Great Britain September 14, 1944

1 Claim. (Cl. 318—369)

This invention concerns improvements in or relating to dynamic braking arrangements for direct current motors and refers more particularly to braking arrangements for motors having a shunt winding (i. e. compound or shunt wound motors) and which are reversible; that is they are provided with switching devices for reversal.

It is a common practice when using motors having a shunt field to short circuit the armature via a resistance at about the time the current thereto is cut off so that the voltage generated by the still revolving armature as it moves in the magnetic field provided by the shunt winding which is still maintained, causes a heavy current to flow through the armature and the work done involves a heavy mechanical load on the armature and brings it rapidly to a standstill. Hitherto such braking arrangements have involved a certain amount of switch gear and the present invention has for its object arrangements whereby this switch gear may be dispensed with and replaced by a metal rectifier as will be more fully explained hereafter.

According to the present invention there are provided dynamic braking arrangements for a motor of the kind referred to comprising a shunt field energised throughout the working period, a switch to cut off the current to the armature, a reversing switch adapted to reverse the connections to the armature brushes after the first said switch has stopped the applied current and a half wave rectifier shunted across the leads to the reversing switch whereby applied voltage cannot cause current to pass through the rectifier at the one position of the reversing switch but the armature generated current can pass therethrough at the second position of the reversing switch and bring the short-circuited armature rapidly to a standstill.

One way of carrying out the invention will now be described with reference to the accompanying drawings in which:

Figure 1 shows a circuit for a motor of the kind referred to,

Figure 2 shows a reversing switch, already shown in Figure 1, in a different position, Figure 3 is a circuit diagram equivalent to Figure 1 and showing the motor connections for one position of the reversing switch, Figure 4 is a view similar to Figure 3 but shows the connections for the other position of the reversing switch.

Referring to Figure 1 the positive lead is shown connected to one side of a switch S and from the other side of the switch the lead goes to a contact marked M appertaining to the reversing switch. Across the switch S there is shunted a further switch device consisting of a timing drum marked T. D., this drum being driven in timed relationship with the shaft of the armature A (e. g. geared thereto) for a purpose explained later.

From the contact M the current can flow through one of the segments of the reversing switch, which are indicated by cross-hatching, to another contact O from which a line leads to one brush of the armature. From the other brush the current passes by the line to the contact G and through the segment to the contact W from which it is carried by the line shown to one end of the series field S. F. and from the other end thereof back to the negative terminal by another line, one end of the shunt field Sh. F being also connected to this latter line. Another line from the positive terminal goes to the other end of the shunt field and thus the latter is always energised throughout a working period irrespective of the positions of the various switches and contact segments.

A half-wave rectifier marked H. W. R. is connected across the two leads in the position shown, that is the connection is made between the switch S and the connection to the reversing switch.

The reversing switch is made in the form of a rotatable switch adapted to be moved by the lever I shown in Figures 1 and 2 which moves, for example, through 45° as shown by the arrow, Figure 2, and this lever is adapted to be operated at intervals by a part of a mechanism driven by the motor. The result of moving the arm from the position shown in Figure 1 to the position shown in Figure 2 is that the contact M is connected to contact G instead of O and contact W is connected to O instead of G. This will be more clearly understood from Figures 3 and 4 where the connections between the contacts are shown by very heavy lines which represent the segments of the switch.

The arrangements above described are particularly suitable for the use with the anti-aircraft gun described in United States patent application Serial No. 488,453, of Desmond W. Molins, Valentine P. Harvey, James A. Mason, and Gordon F. W. Powell, filed May 25, 1943, now Patent 2,439,142, dated April 6, 1948, for operating the loading tray described in said specification and in such a case the lever I is rocked to and fro at the proper times by the final movement of the tray towards each of its positions.

Referring now to Figure 3 which shows the arrangement when the motor is running to carry the tray from the firing position to the loading position, the switch S is intended to represent a switch described in the above-mentioned specification which is operated by the fuze-setter motor, said motor having been put in operation by another switch device.

As described in said specification the switch S only affords a temporary connection to enable the tray motor to start and immediately this takes place the timing drum T. D. which, as aforesaid, is fixed on the armature shaft rotates sufficiently to cause the segments thereon to join the two contacts shown and thus the circuit is still made although the switch S breaks. The motor therefore continues to run and the tray moves over and just before it reaches the other position, the lever I is caused to reverse the switch R. S. but just prior to this the timing drum T. D. has revolved so far that the circuit to the motor is broken.

At this stage therefore the armature of the motor is cut off from the source of supply and ordinarily it would stop after a little time due to friction.

But it is not convenient to allow the motor to stop in this manner because the tray is a heavy mass and if it is not sufficiently checked before it reaches its proper position where it is located by abutments or buffers it will rebound and as the reversing switch has already been operated the motor will run and bring the tray back before its proper time.

To prevent this from occurring, the motor is provided with dynamic braking arrangements which will be more readily understood from Figures 3 and 4. The half-wave rectifier only permits current to pass in one direction and thus when the circuit is as shown in Figure 3 the rectifier is inoperative. As soon as the current is cut off and the reversing switch has changed over to the position shown in Figure 4 the current due to the voltage generated by the still revolving armature moving in the still energised shunt field can pass round the short-circuit as this current is moving in the external circuit in the opposite direction to that of the (previously) applied current. The motor therefore stops due to the generated armature current and is already set to run in the reverse direction as soon as the switch S or any other switch device in parallel therewith is closed. In the case of the gun referred to above this second switch is operated by the rammer. At the end of the reverse movement the current is cut off, the reversing switch is changed and dynamic braking occurs once more, the reversing switch contacts being then as shown in Figure 3 but as the armature is running in the opposite direction to its previous movement the same reasoning applies.

The circuits shown relate to equipment for the previously mentioned gun which uses a 24 volt system but for higher voltages modifications may be made involving the use of more rectifiers and if necessary devices for suppressing sparking in the switches.

What I claim as my invention and desire to secure by Letters Patent is:

A dynamic braking apparatus for a motor comprising a shunt field energized throughout the working period, positive and negative leads for supplying current to the armature of the motor, a switch in one of said leads to switch the current supply to the armature on and off, a reversing switch having input and output terminals, said leads being connected to the input terminals, the output terminals being connected across the motor armature, said reversing switch being arranged to reverse after said first switch has switched off the current supplied through the leads, and a half-wave rectifier shunted across the leads, the rectifier being connected to the lead having the first switch at a point on said lead between the first switch and the reversing switch, whereby applied voltage cannot cause current to pass through the rectifier at the one position of the reversing switch but the armature generated current can pass therethrough at the second position of the reversing switch and bring the short-circuited armature rapidly to a standstill.

GORDON FRANCIS WELLINGTON POWELL.

REFERENCES CITED

The following references are of record in the file of this patent:

UNITED STATES PATENTS

| Number | Name | Date |
| --- | --- | --- |
| 1,933,231 | Stevens | Oct. 31, 1933 |
| 2,090,584 | Valentin | Aug. 17, 1937 |
| 2,397,557 | McCoy | Apr. 2, 1946 |